United States Patent
Kawakami et al.

(10) Patent No.: US 11,956,504 B2
(45) Date of Patent: *Apr. 9, 2024

(54) CONTENT DISTRIBUTION SERVER, CONTENT DISTRIBUTION SYSTEM, CONTENT DISTRIBUTION METHOD, AND PROGRAM

(71) Applicant: DWANGO Co., Ltd., Tokyo (JP)

(72) Inventors: Nobuo Kawakami, Tokyo (JP); Kentarou Matsui, Hokkaido (JP); Shinnosuke Iwaki, Tokyo (JP); Takashi Kojima, Tokyo (JP); Naoki Yamaguchi, Hokkaido (JP)

(73) Assignee: DWANGO CO., LTD. (JP)

( * ) Notice: Subject to any disclaimer, the term of this patent is extended or adjusted under 35 U.S.C. 154(b) by 10 days.

This patent is subject to a terminal disclaimer.

(21) Appl. No.: 17/860,769

(22) Filed: Jul. 8, 2022

(65) Prior Publication Data

US 2022/0353575 A1 Nov. 3, 2022

Related U.S. Application Data

(63) Continuation of application No. 17/257,551, filed as application No. PCT/JP2019/028801 on Jul. 23, 2019, now Pat. No. 11,425,461.

(30) Foreign Application Priority Data

Aug. 31, 2018 (JP) ................. 2018-162619

(51) Int. Cl.
| | |
|---|---|
| *H04N 21/454* | (2011.01) |
| *H04L 65/612* | (2022.01) |
| *H04L 65/75* | (2022.01) |
| *H04N 21/2187* | (2011.01) |
| *H04N 21/258* | (2011.01) |
| *H04N 21/4788* | (2011.01) |

(52) U.S. Cl.
CPC ....... *H04N 21/4542* (2013.01); *H04L 65/612* (2022.05); *H04L 65/75* (2022.05);
(Continued)

(58) Field of Classification Search
CPC .......... H04N 21/4542; H04N 21/2187; H04N 21/258; H04N 21/4788; H04L 65/612; H04L 65/75
See application file for complete search history.

(56) References Cited

U.S. PATENT DOCUMENTS

2008/0263458 A1 10/2008 Altberg et al.
2009/0128549 A1* 5/2009 Gloudemans .......... G06T 15/20
345/419
(Continued)

FOREIGN PATENT DOCUMENTS

WO 2008106196 A1 9/2008

OTHER PUBLICATIONS

Dwango Co., Ltd., "Virtual cast 1.2.2a release," Jun. 11, 2018, previously available at http://ch.nicovideo.jp/infiniteloop/blomaga/ar1564665, 5 pgs.
(Continued)

*Primary Examiner* — Sumaiya A Chowdhury
(74) *Attorney, Agent, or Firm* — Bracewell LLP; Doug F. Stewart; Patrick J. Connolly

(57) ABSTRACT

Provided is a content distribution server which is able to establish restrictions on the public disclosure of an object displayed in virtual space at the convenience of the distributor. The content distribution server comprises: a distribution unit that distributes live content for synthesizing video in virtual space using information from the distributor as virtual character information; and a first setting receiving unit that receives from the distributor terminal used by the distributor public disclosure restriction settings for estab-
(Continued)

lishing restrictions on objects present in virtual space displayed on the distributor terminal that can be viewed on a viewer terminal used by a viewer to view live content.

8 Claims, 11 Drawing Sheets

(52) U.S. Cl.
CPC ....... *H04N 21/2187* (2013.01); *H04N 21/258* (2013.01); *H04N 21/4788* (2013.01)

(56) References Cited

U.S. PATENT DOCUMENTS

| | | | |
|---|---|---|---|
| 2013/0147950 A1* | 6/2013 | Iwaki ................ | H04N 21/2187 |
| | | | 348/143 |
| 2014/0279318 A1* | 9/2014 | Friedman ............... | G06Q 30/04 |
| | | | 705/32 |
| 2019/0107935 A1* | 4/2019 | Spivack ............ | G06Q 30/0277 |
| 2019/0113979 A1 | 4/2019 | Tyagi et al. | |

OTHER PUBLICATIONS

Dwango Co., Ltd., "Virtual cast 1.2.6a release," Jul. 19, 2018, previously available at http://ch.nicovideo.jp/infiniteloop/blomaga/ar1621360, 4 pgs.

Infinite Loop, "Virtual cast 1.2.4b release," Jun. 25, 2018, available at infiniteloop.co.jp/blog/2018/06/virtualcast-124-release/, 7 pgs.

Mogura Inc., "Thorough description! Anyone with the 'virtual cast' which gets used to VTuber?", Apr. 21, 2018, available at https://www.moguravr.com/virtualcast-2/, 44 pgs.

PCT/JP2019/028801 International Search Report and Written Opinion dated Aug. 20, 2019, 2 pgs.

* cited by examiner

[Fig. 1]
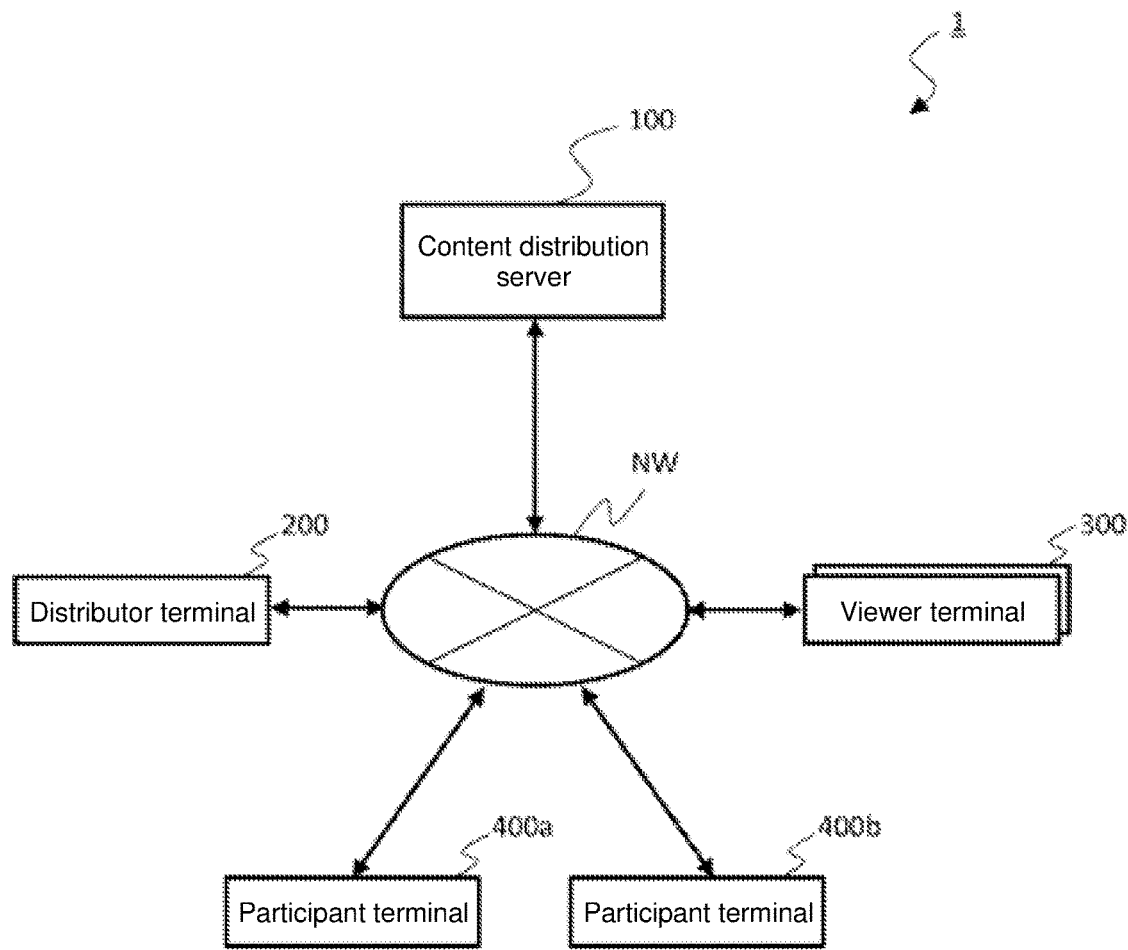

[Fig. 2]
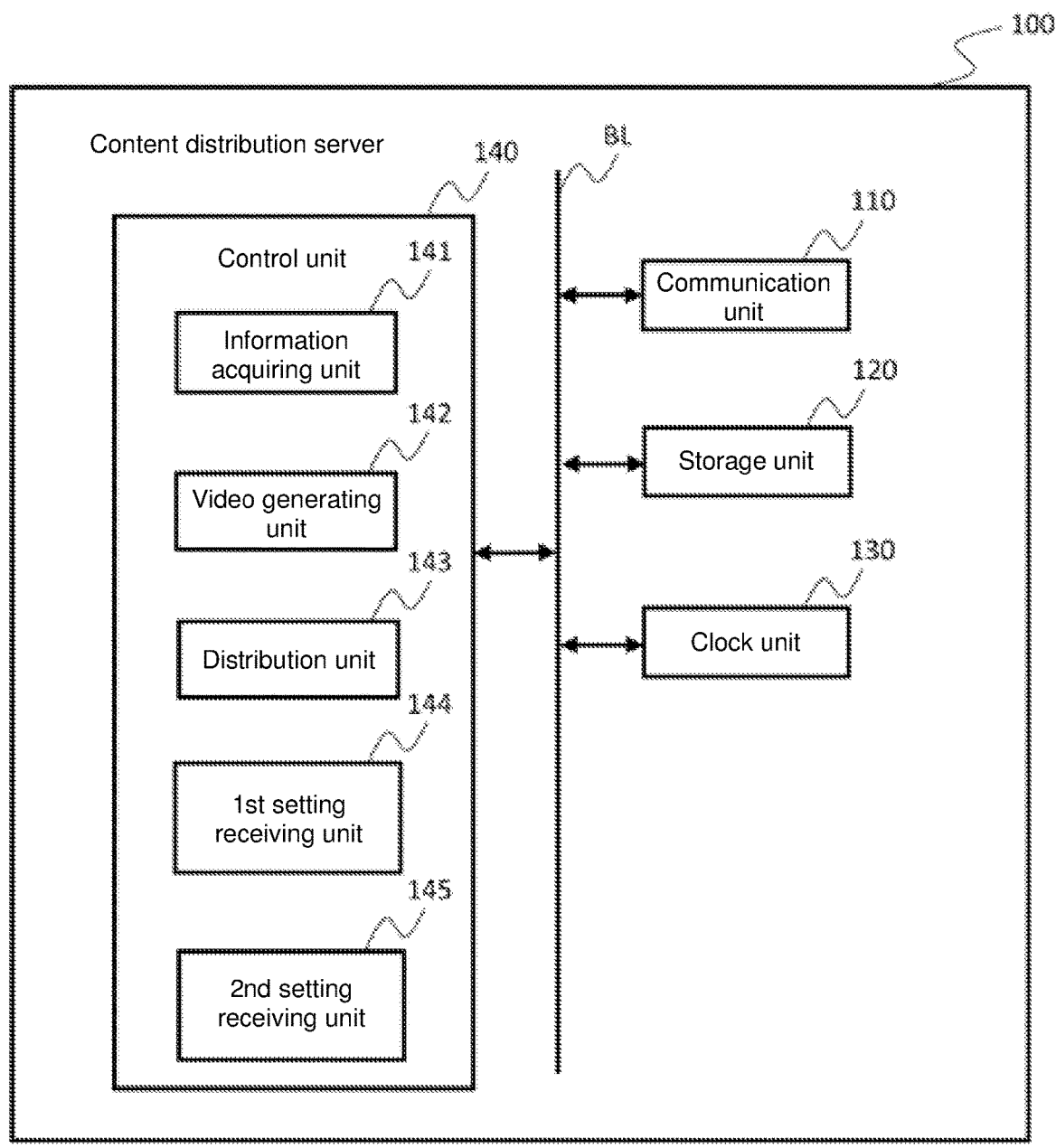

[Fig. 3]
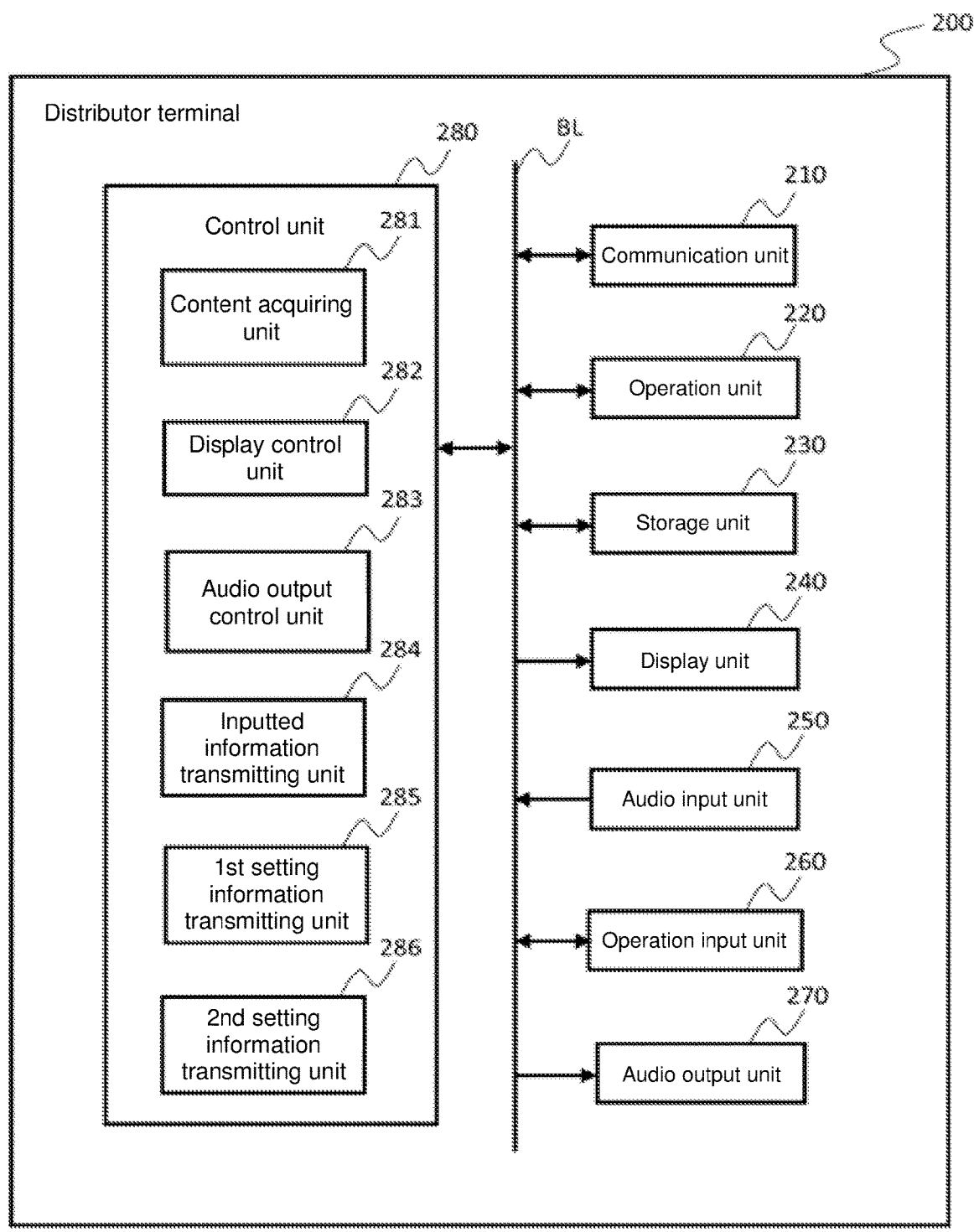

[Fig. 4]
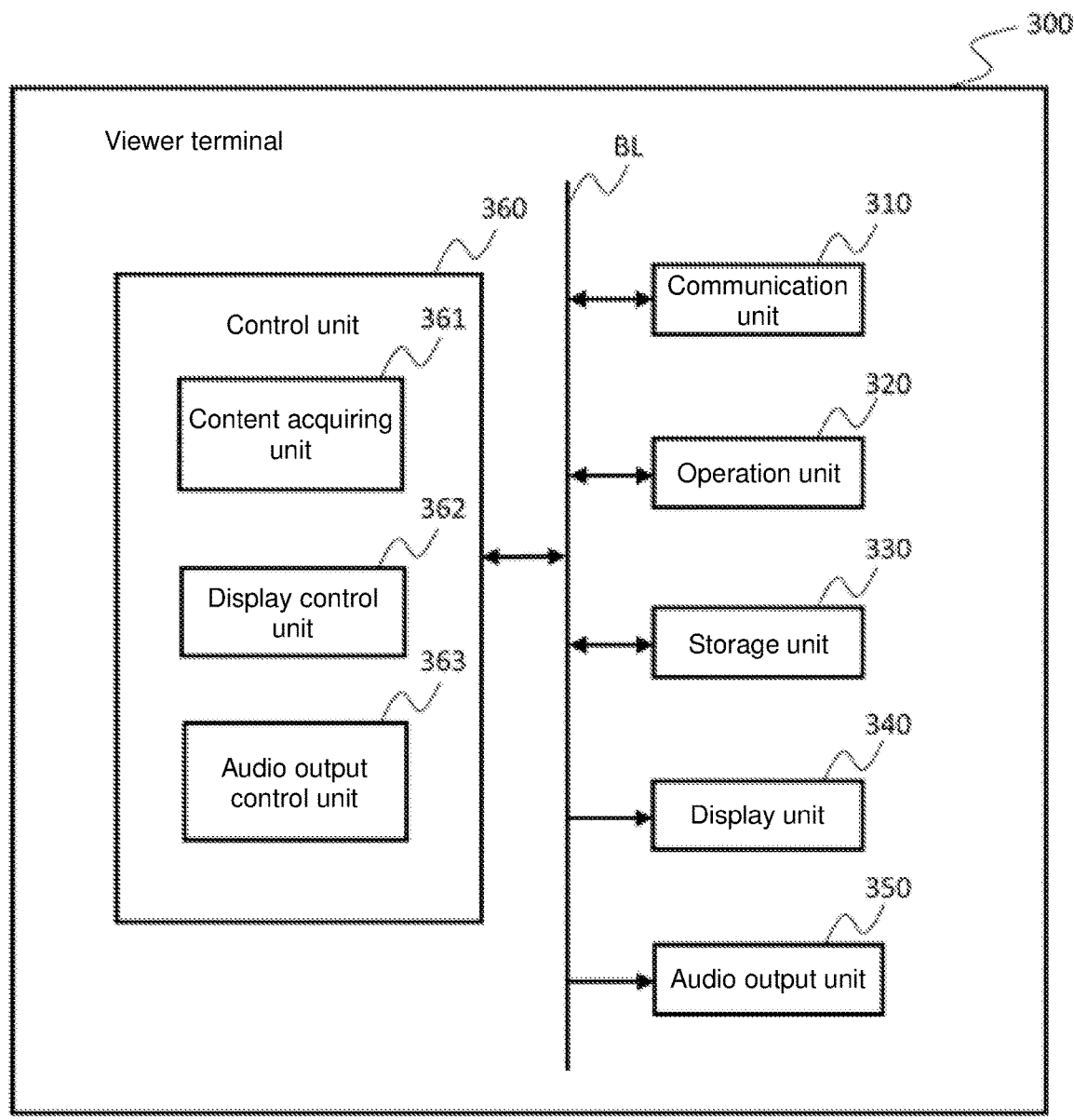

[Fig. 5]
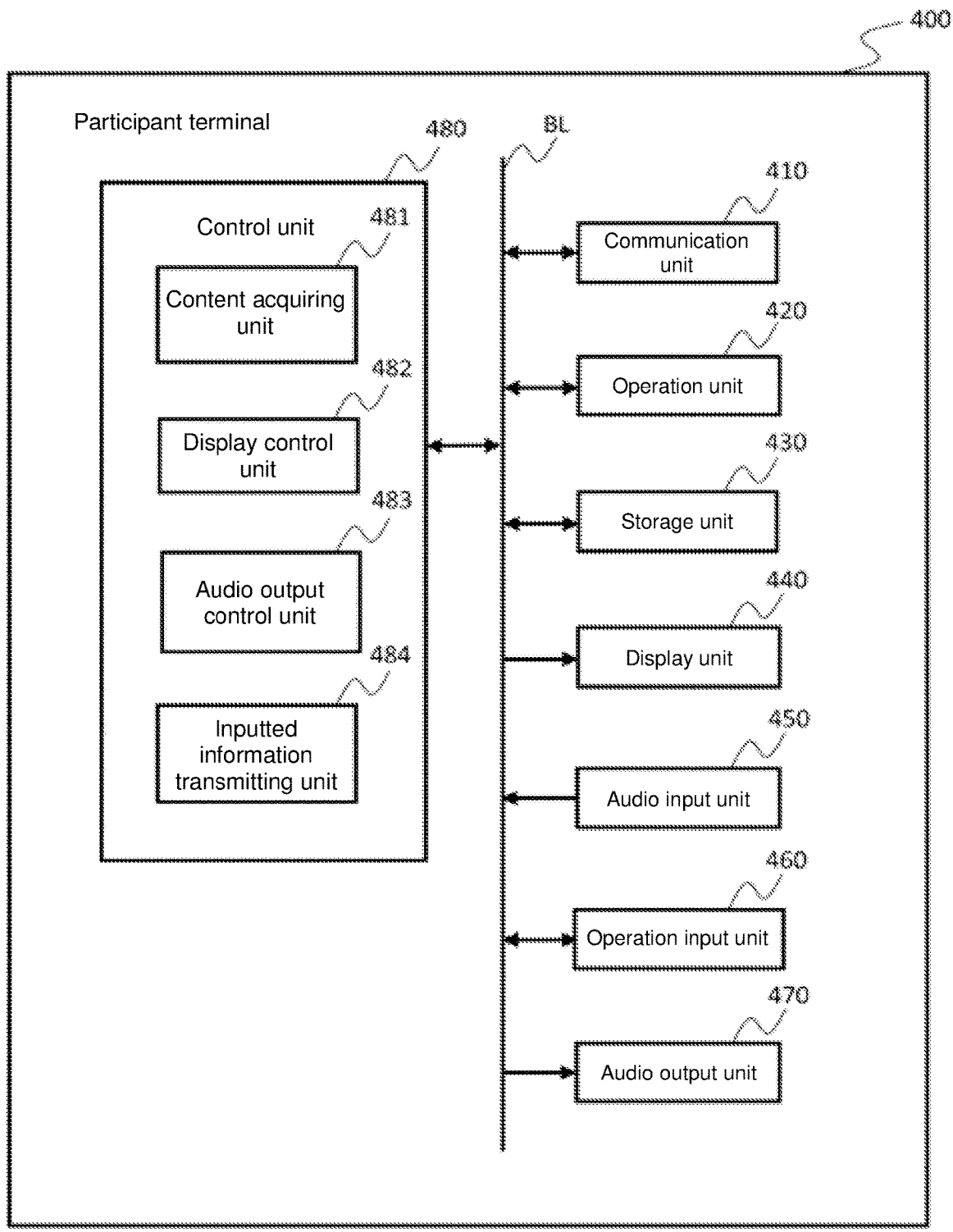

[Fig. 6]
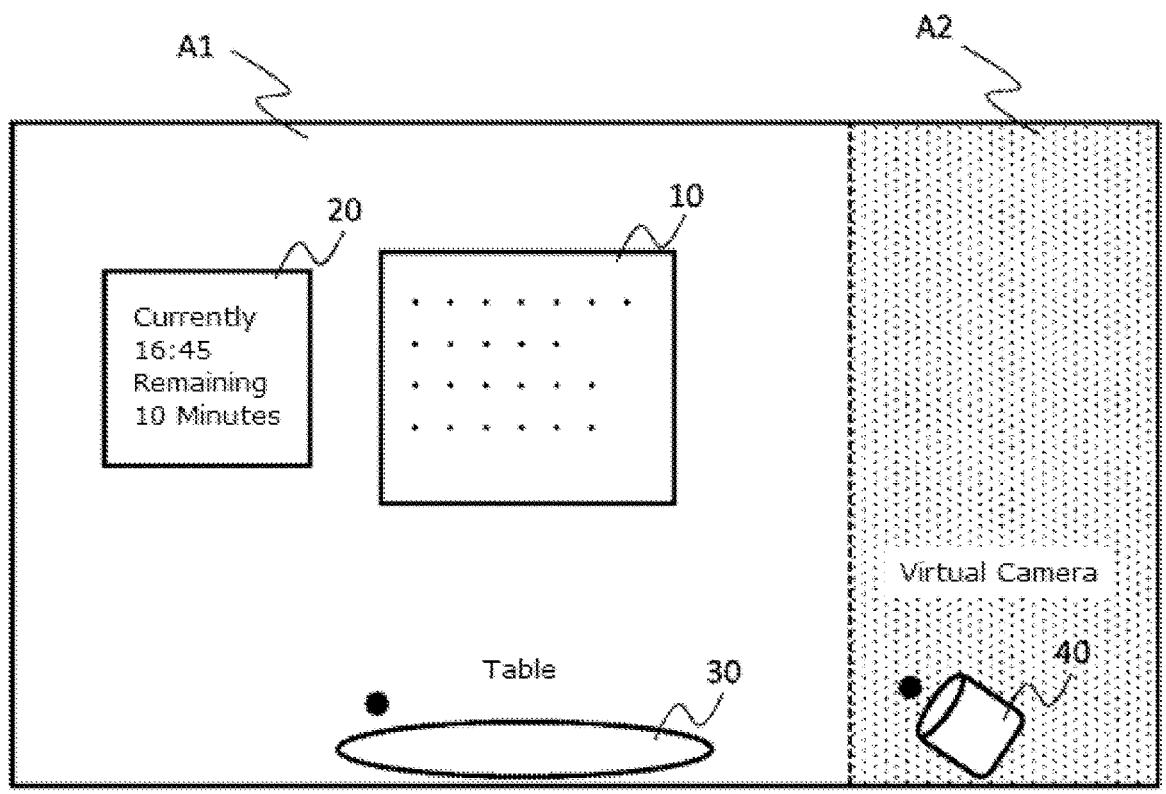

[Fig. 7]
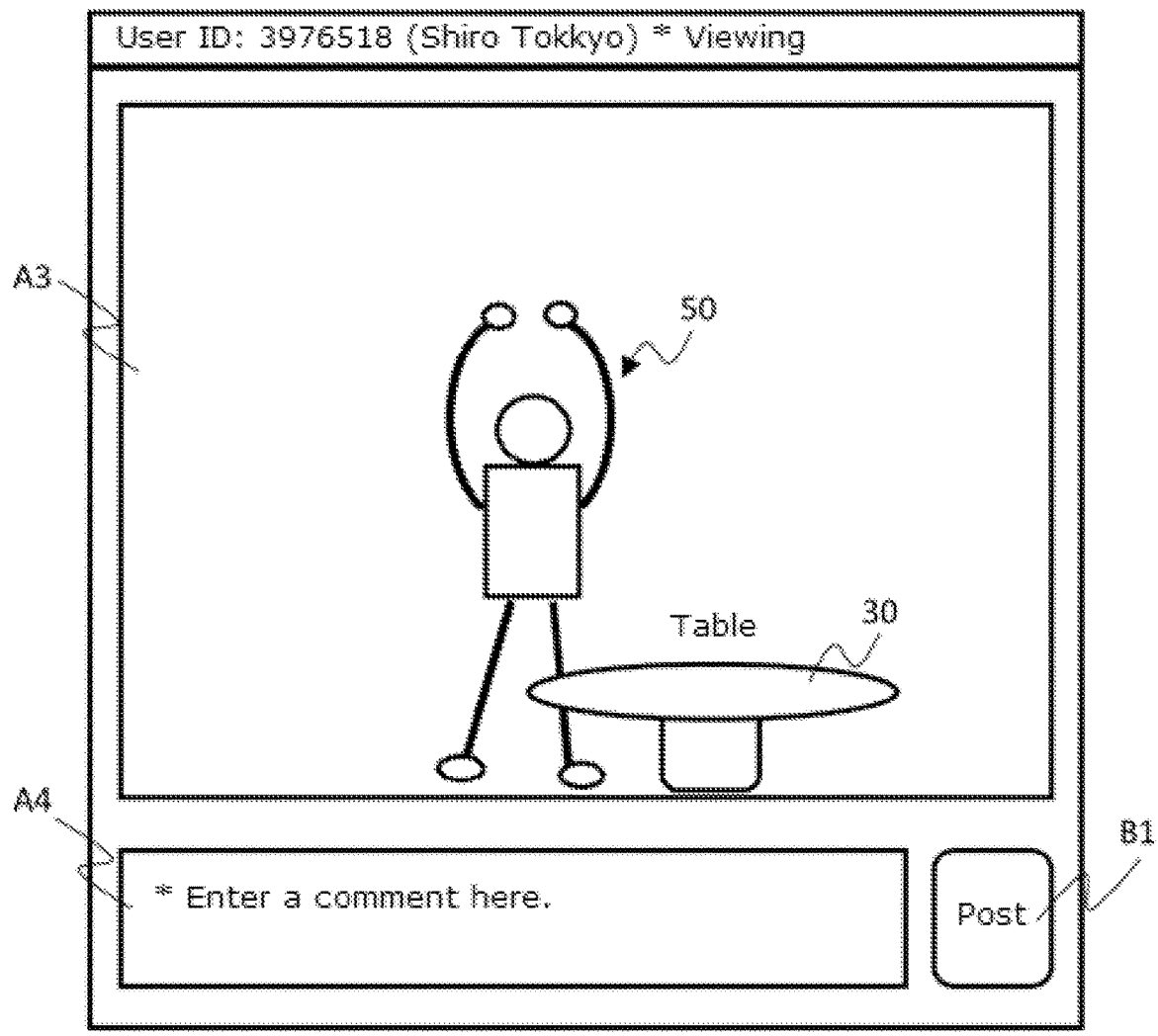

[Fig. 8]
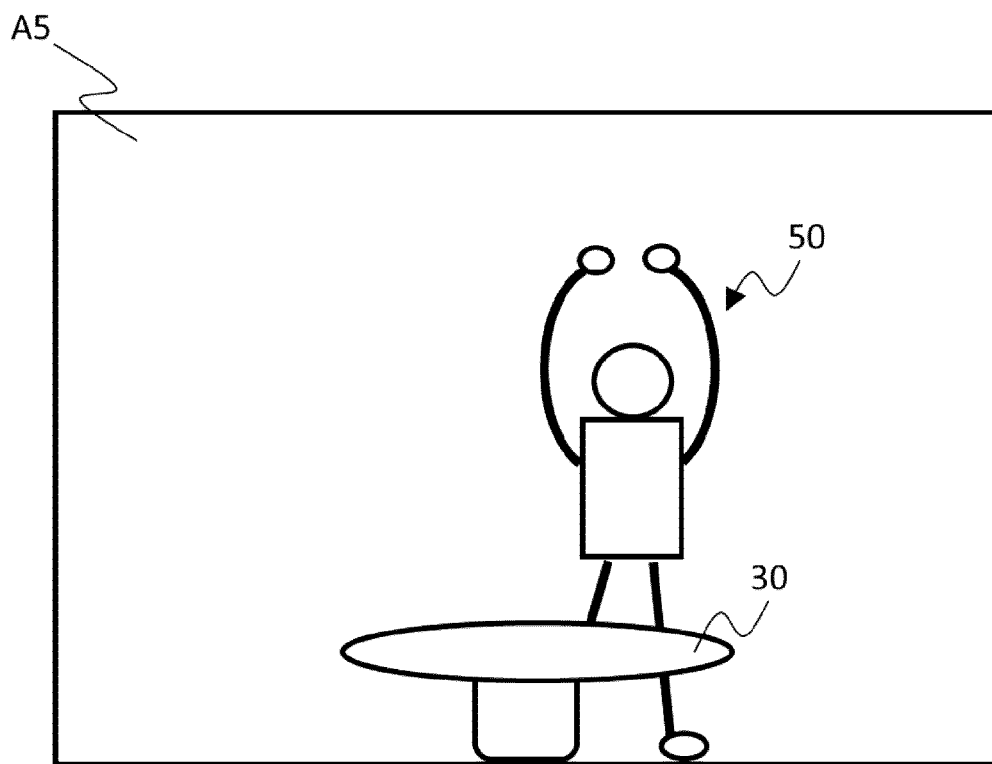

[Fig. 9]
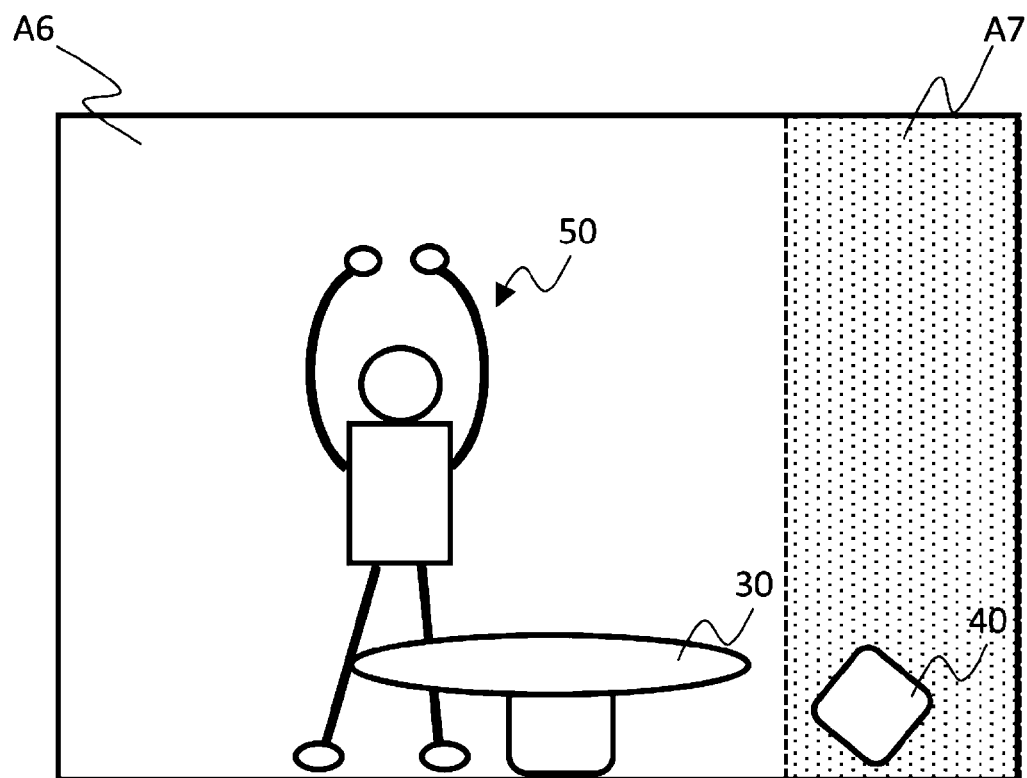

[Fig. 10]
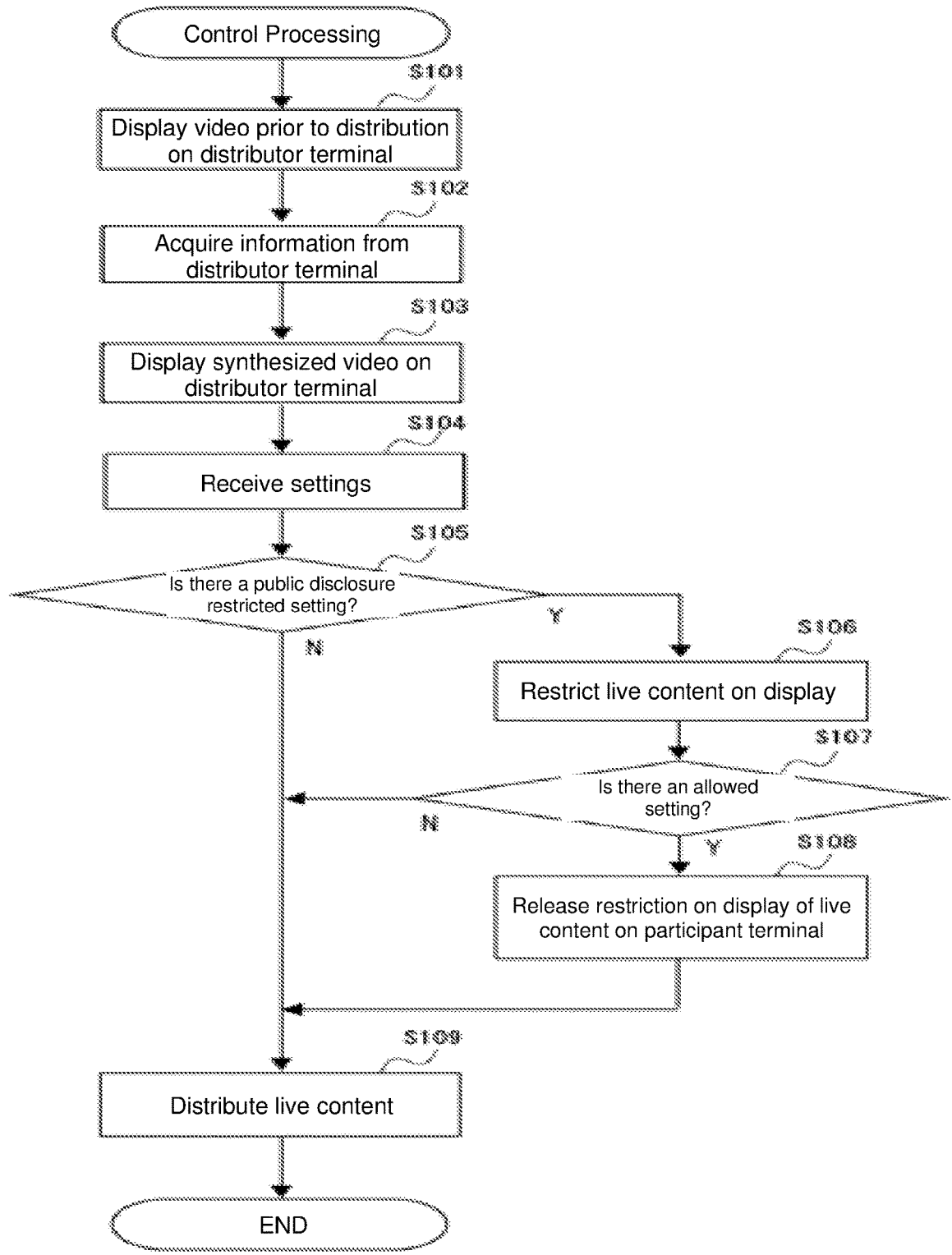

[Fig. 11]
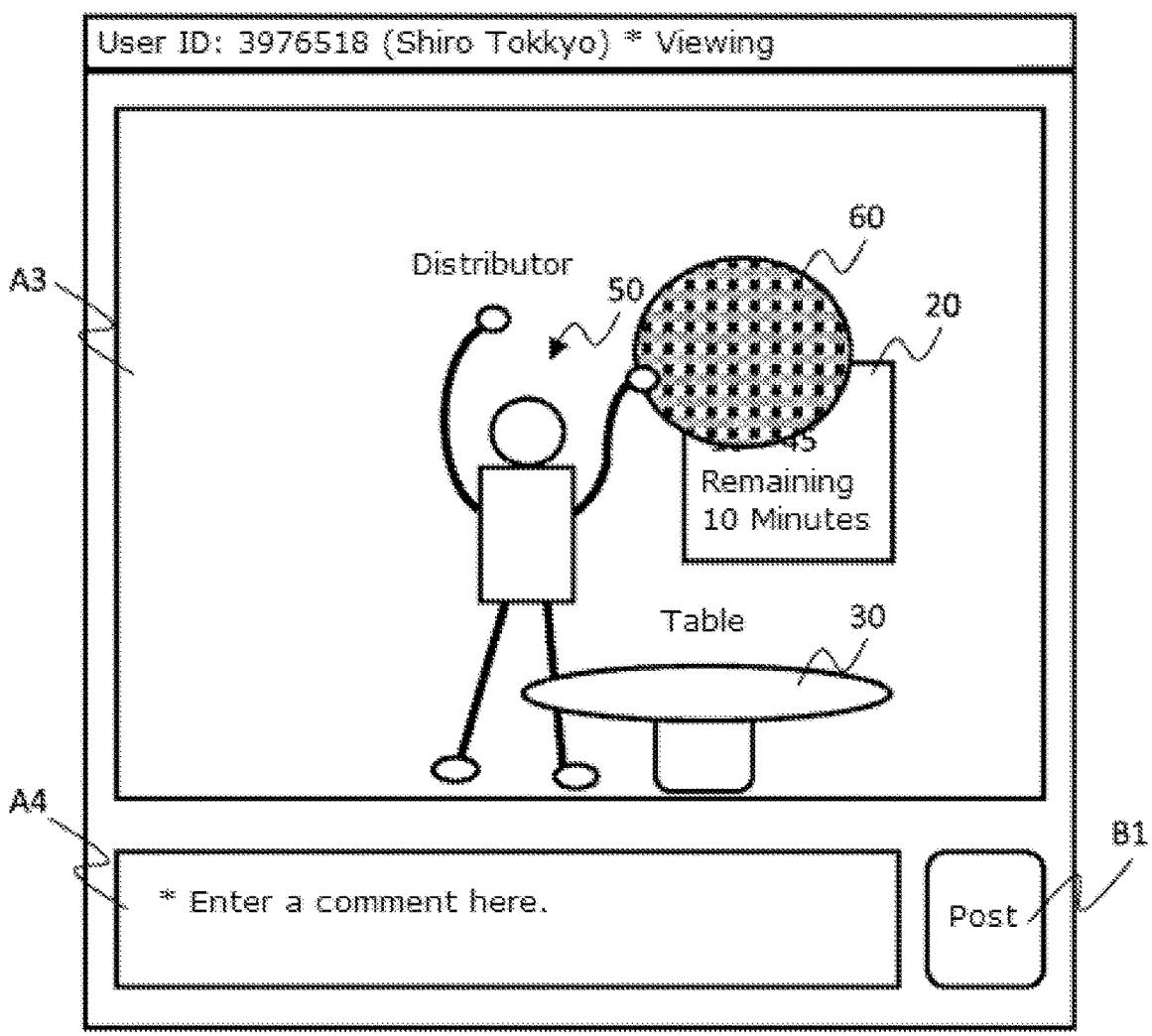

CONTENT DISTRIBUTION SERVER, CONTENT DISTRIBUTION SYSTEM, CONTENT DISTRIBUTION METHOD, AND PROGRAM

This application claims priority to U.S. application Ser. No. 17/257,551 as a continuation application under 35 U.S.C. § 120. The present disclosure relates to a content distribution server, a content distribution method, and a program.

TECHNICAL FIELD

Background Art

There are systems in which users are able to communicate with each other in virtual space.

For example, Patent Document 1 discloses a technique that provides a virtual environment for users to communicate with each other. In this virtual environment, it is possible to set browsing rights for virtual messages in the virtual space. In this case, only browsers who have browsing rights can browse through the virtual messages. When a browser without browsing right attempts to browse through the virtual messages, the virtual messages are hidden or blurred.

In recent years, services that deliver live content via a network have become widespread as live broadcasting over the internet. Technologies been proposed for live broadcasting over the internet in which the distributor appears as a virtual character (avatar) in virtual space in video that is distributed as live content.

PRIOR ART DOCUMENTS

Patent Documents

Patent Document 1: WO 2008/106196 A1

SUMMARY OF THE INVENTION

Problem to be Solved by the Invention

The technology disclosed in Patent Document 1 is premised on all users inhabiting the virtual space as virtual characters. In this case, all users share the virtual space from the same viewpoint.

In live Internet broadcasting by contrast, there are not only users who inhabit the virtual space as virtual characters (primarily distributors) but also users who simply watch the video (primarily viewers). In this case, the viewpoint varies by user. Therefore, it is sometimes not preferable for all users to share the virtual space from the same viewpoint.

Current live internet broadcasting systems are designed so that a distributor, viewers, and participants who participate in the distributed content browse the same virtual space. The distributor wears an HMD (head mounted display) and distributes content while watching video in virtual space. Movements by the distributor in real space are reflected in movements of a virtual character in virtual space using a motion capture technology.

Here, the distributor may want to check a script or a timekeeper while distributing content. Because the distributor is wearing an HMD, a script or timekeeper cannot be checked in real space. Therefore, an object indicating a script or timekeeper is preferably displayed in virtual space. However, an object indicating a script or timekeeper is not an object that the distributor wants the viewer to see. In addition, the distributor may want to check the virtual camera used to record distributed content or an object indicating the position of the virtual camera. However, an object indicating a virtual camera or the position of a virtual camera is not an object that the distributor wants the viewer to see.

As mentioned above, an object displayed in virtual space for the convenience of the distributor, such as a script, timekeeper, or virtual camera (position of the virtual camera) is preferably not disclosed to viewers. However, sometimes the distributor may wish to disclose these objects to participants (viewers or other distributors) who participate in the content distributed by the distributor. Therefore, a mechanism for restricting the disclosure of objects displayed in virtual space based on distribution status is required for the convenience of the distributor.

Because the technology disclosed in Patent Document 1 is used to control browsing rights to virtual messages addressed to others, it is not a mechanism that can be used to restrict the disclosure of objects displayed in virtual space at the convenience of the distributor.

In view of these circumstances, it is an object of the present disclosure to provide a content distribution server etc. that is able to impose a public restriction on an object displayed in virtual space at the convenience of a distributor.

Means for Solving the Problem

In order to achieve this object, a first aspect of the present invention is a content distribution server comprising: a distribution unit that distributes live content for synthesizing video in virtual space with information on the distributor as information on a virtual character; and a first setting receiving unit that receives a disclosure restriction setting from a distributor terminal used by the distributor for restricting an object present in the virtual space displayed on the distributor terminal from being displayed on a viewer terminal used by a viewer viewing the live content.

In order to achieve this object, a second aspect of the present invention is a content distribution method comprising: a distribution step of distributing live content for synthesizing video in virtual space with information on the distributor as information on a virtual character; and a first setting receiving step of receiving a disclosure restriction setting from a distributor terminal used by the distributor for restricting an object present in the virtual space displayed on the distributor terminal from being displayed on a viewer terminal used by a viewer viewing the live content.

In order to achieve this object, a third aspect of the present invention is a program causing a computer to function as a distribution means for distributing live content for synthesizing video in virtual space with information on the distributor as information on a virtual character; and a first setting receiving means for receiving a disclosure restriction setting from a distributor terminal used by the distributor for restricting an object present in the virtual space displayed on the distributor terminal from being displayed on a viewer terminal used by a viewer viewing the live content.

Effects of the Invention

The present disclosure is able to provide a content distribution server etc. that is able to impose a public restriction on an object displayed in virtual space at the convenience of a distributor.

BRIEF DESCRIPTION OF THE DRAWINGS

FIG. 1 is a diagram showing the configuration of the content distribution system in an embodiment of the present invention.

FIG. 2 is a block diagram showing the configuration of the content distribution server in the embodiment of the present invention.

FIG. 3 is a block diagram showing the configuration of the distributor terminal in the embodiment of the present invention.

FIG. 4 is a block diagram showing the configuration of the viewer terminal in the embodiment of the present invention.

FIG. 5 is a block diagram showing the configuration of the participant terminal in the embodiment of the present invention.

FIG. 6 is a diagram showing an example of video in virtual space displayed on the distributor terminal in the embodiment of the present invention.

FIG. 7 is a diagram showing an example of a distribution screen displayed on the viewer terminal in the embodiment of the present invention.

FIG. 8 is a diagram showing a first example of video in virtual space displayed on the participant terminal in the embodiment of the present invention.

FIG. 9 is a diagram showing a second example of video in virtual space displayed on the participant terminal in the embodiment of the present invention.

FIG. 10 is a flowchart showing an example of control processing performed by the content distribution server in the embodiment of the present invention.

FIG. 11 is a diagram showing an example of a screen displayed on the viewer terminal in the modified example.

EMBODIMENT OF THE INVENTION

The following is a description of an embodiment of the present disclosure with reference to the drawings. It should be noted that the embodiment described below does not place any unreasonable limits on the content of the present disclosure described in the claims. In addition, not all of the components shown in the embodiment are essential components of the present disclosure.

Embodiment

As shown in FIG. 1, the content distribution system 1 in the present embodiment includes a content distribution server 100, one or more distributor terminals 200, one or more viewer terminals 300, and participant terminals 400a and 400b. The content distribution server 100, one or more distributor terminals 200, one or more viewer terminals 300, and participant terminals 400a, 400b are connected over a network NW so as to be able to communicate with each other. The network NW can be a WAN (Wide Area Network).

The content distribution server 100 provides a distribution service via the network NW. The content distribution server 100 distributes live content to the viewer terminals 300 based on video in virtual space that synthesizes movements by the distributor as movements by a virtual character.

The video in virtual space includes not only virtual characters but also a background setting and objects appearing as virtual objects. Virtual space is basically three-dimensional space generated by CG (computer graphics). Note, however, that the virtual space may also be two-dimensional space. Distributors include distributor who manage the distributed content and distributor who participate in the distributed content. Other distributors may include viewers who wish to participate, and distributors of other distributed content.

The distributor terminal 200 is used by a distributor who distributes live content. The distributor terminal 200 is a communication terminal provided with an HMD, and has a communication function and a motion capture function. The distributor terminal 200 acquires movement (gestures) and the line of sight of the distributor as motion information with the motion capture function. The motion information is reflected in the movement of the virtual character associated with the distributor and the viewpoint (that is, rendering) in video within virtual space. The motion information may include data indicating the facial expressions of the distributor.

The viewer terminal 300 is a device having a communication function such as a personal computer, a tablet terminal, or a smartphone. The viewer terminal 300 is used by a viewer to view live content.

The participant terminals 400a, 400b are used by participants who each participate in distributed content from the distributor. The participants may be distributors other than the distributor using the distributor terminal 200, or may be viewers who view the live content. Unlike the viewer terminal 300, however, the participant terminals 400a, 400b are configured to allow the participants to participate in the distributed content as virtual characters.

In the present embodiment, participant terminal 400a is used by a viewer and participant terminal 400b is used by another distributor. A disclosure restriction setting described below is applied to participant terminal 400a, and the disclosure restriction setting is released for participant terminal 400b by a permission setting described below. In the present embodiment, the participants are a viewer and another distributor. However, the number and breakdown of participants are not limited to those described in the present embodiment.

The participant terminals 400a, 400b are communication terminals provided with an HMD, and have a communication function and a motion capture function. The participant terminals 400a, 400b acquire movement (gestures) and the line of sight of the participant as motion information with the motion capture function. The motion information is reflected in the movement of the virtual character associated with the participant and the viewpoint (that is, rendering) in video within virtual space. The motion information may include data indicating the facial expressions of the participant. In the following explanation, participant terminals 400a and 400b are referred to collectively as the participant terminals 400 when there is no need to distinguish between them.

<Configuration of Content Distribution Server>

The configuration of the content distribution server 100 will now be described in detail. As shown in FIG. 2, the content distribution server 100 includes a communication unit 110 that communicates with other devices, a storage unit 120 that stores various types of data, a clock unit 130 that keeps time, and a control unit 140 for controlling the entire device. These components are connected to each other via a bus line BL.

The communication unit 110 is a communication interface including a NIC (Network Interface Card) controller for performing wired communication or wireless communication. The communication unit 110 communicates with a distributor terminal 200 and a viewer terminal 300 via a network NW.

The storage unit 120 is composed, for example, of RAM (random access memory) and ROM (read only memory). The storage unit 120 stores programs and various types of data etc. for executing various types of control processing.

The clock unit 130 can include, for example, an oscillation circuit for generating clock signals, a variable PLL (phase locked loop), and a counter circuit for counting the number of clock signal pulses. The clock unit 130 keeps the time based on the number of pulses counted.

The control unit 140 is composed of a CPU (central processing unit) etc. The control unit 140 controls the entire operation of the content distribution server 100 by executing a program stored in the storage unit 120. The control unit 140 executes various controls on timing based on the number of pulses counted by the clock unit 130. The control unit 140 also counts the elapsed time from the start of the live content based on the time kept by the clock unit 130, and determines whether or not a predetermined time (for example, the scheduled distribution time) has elapsed.

The functional configuration of the control unit 140 will now be described. The control unit 140 functions as an information acquiring unit 141, a video generating unit 142, a distribution unit 143, a first setting receiving unit 144, and a second setting receiving unit 145.

The information acquiring unit 141 acquires information on the virtual character used by the distributor and motion information indicating the movement and line of sight of the distributor from the distributor terminal 200 via the communication unit 110. The information acquiring unit 141 also acquires information on the virtual character used by the participant and motion information indicating the movement and line of sight of the participant from the participant terminal 400 via the communication unit 110. The information acquiring unit 141 acquires audio information from the distributor terminal 200 and the participant terminal 400 via the communication unit 110.

The video generating unit 142 generates video in virtual space in which information from the distributor and the participant is synthesized as information on their virtual characters. The synthesis can be realized, for example, by generating video in which the virtual characters are present against a predetermined virtual space serving as the background, and generating video so that the virtual characters reflect movements by the distributor or participant using the virtual characters.

The distribution unit 143 distributes live content based on the video generated by the video generation unit 142. Live content based on the generated video is information indicating video rendered from each viewpoint relative to the generated video data. Specifically, the live content contains information indicating video in which the generated video is viewed from the viewpoint of the virtual character of the distributor and video (distribution screen) in which the generated video is viewed from the viewpoint of the virtual camera for distribution.

The live content distributed by the distribution unit 143 includes not only information indicating video but also audio information. The distribution unit 143 distributes audio information acquired by the information acquiring unit 141 and audio information stored in the storage unit 120 in advance and used in the production as live content.

The first setting receiving unit 144 receives a disclosure restriction setting from the distributor terminal 200 via the communication unit 110. When a disclosure restriction setting is received, the distribution unit 143 restricts display on the viewer terminal 300 of an object present in the virtual space displayed on the distributor terminal 200.

The object subject to the disclosure restriction setting at the convenience of the distributor is an object indicating a virtual object displayed in the virtual space. The object subject to the disclosure restriction setting can be, for example, an object indicating a script, a timekeeper, a virtual camera, or the position of the virtual camera.

In the present disclosure, script is broadly defined and is not limited, for example, to the composition of the distributed content, the materials used, or lines displayed in chronological order. Here, script means material that a distributor refers to during production of distributed content and that the distributor does not want to be seen by viewers. Script can refer, for example, to materials used in the distribution of news articles, bank account registers, books, and photographs. An object showing a script moves with the distributor (that is, the virtual character of the distributor), and is displayed at a predetermined position in the field of view of the virtual space displayed on the distributor terminal 200. For example, an object showing a script is controlled by the content distribution server 100 so as to follow the virtual character of the distributor but maintain a certain distance. This tracking control may also be executed for an object indicating a timekeeper.

There are multiple patterns for public restriction settings. For example, the first setting receiving unit 144 may receive a switching setting for an object indicating whether or not to display the object on the viewer terminal 300, and receives the switching setting as the disclosure restriction setting. The first setting receiving unit 144 may also receive a display changing setting for the object to display the object as another object or to display the object in a blurred state on the viewer terminal 300, and receives the display changing setting as the disclosure restriction setting.

The first setting receiving unit 144 may also receive a setting for setting aside an area in the virtual space displayed on the distributor terminal 200 as a private area that is not displayed on a viewer terminal 300, and establishes a public restriction setting for the object via the private area. A public restriction setting for an object via the private area may be established, for example, by the distributor moving the object to the private area in the virtual space using a physical action. A public restriction setting for an object via the private area may also be established, for example, by the distributor executing an interface operation to move the object. The interface operation can be, for example, pressing an operation button or making a predetermined gesture. The location of the private area may be fixed at a location in the virtual space determined by the distributor, or may follow movement by the virtual character of the distributor under the direction of the content distribution server 100.

The distribution unit 143 assigns a marker indicating whether or not an object present in virtual space displayed on the distributor terminal 200 is subject to a disclosure restriction setting. Examples of markers include a camera mark, a light bulb mark, or a simple figure such as a black circle or a white circle. The distributor can determine the setting status by displaying video with these markers on the distributor terminal 200.

The second setting receiving unit 145 receives the permission setting from the distributor terminal 200 via the communication unit 110. When a permission setting is received, the distribution unit 143 displays the object subject to the disclosure restriction setting on a participant terminal 400. The permission setting may be applied to some or all of the objects subject to a disclosure restriction setting.

<Configuration of Distributor Terminal>

The configuration of the distributor terminal 200 will now be described in detail. As shown in FIG. 3, the distributor terminal 200 includes a communication unit 210 for communicating with other devices, an operation unit 220 for receiving user operations, a storage unit 230 for storing various types of data, a display unit 240 for displaying various types of images, an audio input unit 250 for receiving audio input, an operation input unit 260 for inputting motion information, an audio output unit 270 for outputting various types of audio, and a control unit 280 for controlling the entire device. These components are connected to each other via a bus line BL.

The communication unit 210 is a communication interface including a NIC for conducting wired communication or wireless communication. The communication unit 210 communicates with the content distribution server 100 via the network NW.

The operation unit 220 can include, for example, operation buttons, a keyboard, and a pointing device, and is an interface used by the user to input instructions.

The storage unit 230 can be, for example, RAM or ROM. The storage unit 230 stores programs and inputted data for executing various types of control processing.

The display unit 240 can be, for example, an LCD (liquid crystal display) or an EL (electroluminescence) display. The display unit 240 displays text, images, etc. based on data inputted from the control unit 280.

The audio input unit 250 can be, for example, a microphone. The audio input unit 250 receives audio inputted from the outside to obtain audio information.

The operation input unit 260 receives input operations from the user as user motion information. The operation input unit 260 can be, for example, a camera or a sensor for acquiring motion information using a motion capture technology. Motion information can be detected by, for example, a sensor that senses the user's line of sight and movements (gestures). Motion information may also be acquired, for example, by pressing a button to express a facial expression on the virtual character or perform a predetermined act.

The process of converting motion information from the user into movement by or a change in the line of sight of the virtual character may be executed by the content distribution server 100, the distributor terminal 200, or the content distribution server 100 and the distributor terminal 200 working together.

The audio output unit 270 can be composed of, for example, a speaker and an amplifier. The audio output unit 270 outputs audio according to data inputted from the control unit 280.

The control unit 280 can be, for example, a CPU. The control unit 280 controls the entire operation of the distributor terminal 200 by executing a program stored in the storage unit 230.

The functional configuration of the control unit 280 will now be described. The control unit 280 functions as a content acquiring unit 281, a display control unit 282, an audio output control unit 283, an inputted information transmitting unit 284, a first setting information transmitting unit 285, and a second setting information transmitting unit 286.

The content acquiring unit 281 acquires data indicating live content from the content distribution server 100 via the communication unit 210. The display control unit 282 displays video in virtual space on the display unit 240 based on the data indicating live content acquired by the content acquiring unit 281. The audio output control unit 283 outputs audio from the audio output unit 270 based on the data indicating live content acquired by the content acquiring unit 281.

The inputted information transmitting unit 284 transmits audio information acquired by the audio input unit 250 and motion information acquired by operation input unit 260 to the content distribution server 100. The inputted information transmitting unit 284 may transmit the information to the content distribution server 100 after reflecting the motion information in a virtual character.

The first setting information transmitting unit 285 transmits information indicating a disclosure restriction setting received from the user to the content distribution server 100 via the communication unit 210. The second setting information transmitting unit 286 transmits information indicating a permission setting received from the user to the content distribution server 100 via the communication unit 210.

<Configuration of Viewer Terminal>

The configuration of the viewer terminal 300 will now be described in detail. As shown in FIG. 4, the viewer terminal 300 includes a communication unit 310 for communicating with other devices, an operation unit 320 for receiving user input operations, a storage unit 330 for storing various types of data, a display unit 340 for displaying various types of images, an audio output unit 350 for outputting audio, and a control unit 360 for controlling the entire device. These components are connected to each other via a bus line BL.

The communication unit 310 is a communication interface including a NIC for conducting wired communication or wireless communication. The communication unit 310 communicates with the content distribution server 100 via the network NW.

The operation unit 320 can include, for example, operation buttons, a keyboard, and a pointing device, and is an interface used by the user to input instructions.

The storage unit 330 can be, for example, RAM or ROM. The storage unit 330 stores programs and inputted data for executing various types of control processing.

The display unit 340 can be, for example, an LCD (liquid crystal display) or an EL (electroluminescence) display. The display unit 340 displays text, images, etc. based on data inputted from the control unit 360.

The audio output unit 350 can be composed of, for example, a speaker and an amplifier. The audio output unit 350 outputs audio according to data inputted from the control unit 360.

The control unit 360 can be, for example, a CPU. The control unit 360 controls the entire operation of the viewer terminal 300 by executing a program stored in the storage unit 330.

The functional configuration of the control unit 360 will now be described. The control unit 360 functions as a content acquiring unit 361, a display control unit 362, and an audio output control unit 363.

The content acquiring unit 361 acquires data indicating live content from the content distribution server 100 via the communication unit 310. The display control unit 362 displays video in virtual space on the display unit 340 based on the data indicating live content acquired by the content acquiring unit 361. The audio output control unit 363 outputs audio from the audio output unit 350 based on the data indicating live content acquired by the content acquiring unit 361.

<Configuration of Participant Terminal>

The configuration of the participant terminal 400 will now be described in detail. As shown in FIG. 5, the participant terminal 400 includes a communication unit 410 for communicating with other devices, an operation unit 420 for receiving user input operations, a storage unit 430 for storing various types of data, a display unit 440 for displaying various types of images, an audio input unit 450 for outputting audio, an operation input unit 460 for inputting motion information, an audio output unit 470 for outputting various types of audio, and a control unit 480 for controlling the entire device. These components are connected to each other via a bus line BL.

The configuration of a participant terminal 400 is basically the same as that of a distributor terminal 200. For example, a participant terminal 400 has functions for acquiring movement by the participant as information necessary for participation of the participant in distributed content, and sending this information to the content distribution server 100 to reflect it in the movement of the participant's virtual character.

However, a participant terminal 400 differs from a distributor terminal 200 in that it does not have a function for receiving disclosure restriction settings and permission settings. The control unit 480 in the participant terminal 400 functions as a content acquiring unit 481, a display control unit 482, an audio output control unit 483, and an inputted information transmitting unit 484. These functions are the same as those of the content acquiring unit 281, display control unit 282, audio output control unit 283, and inputted information transmitting unit 284 in the control unit 280 of a distributor terminal 200.

<Specific Example of Video and Distribution Screens>

Specific examples of video and distribution screens displayed based on information indicating that live content is being streamed will now be described.

FIG. 6 is a diagram showing an example of video in virtual space displayed on the distributor terminal 200. The video of the virtual space displayed on the distributor terminal 200 includes an area A1 that is not a private area and an area A2 that is designated as a private area. The private area is an area set based on a public restriction setting, and this area A2 is not displayed on viewer terminals 300.

As shown in the drawing, an object 10 indicating a script, an object 20 indicating a timekeeper, and an object 40 indicating a virtual camera are displayed in the video from the distributor's point of view. These objects 10, 20, 30, 40 are displayed for the convenience of the distributor. An object 30 indicating a table is also displayed in the video.

Instead of an object 40 indicating a virtual camera, an object indicating, for example, the position, shooting angle, or shooting range of the virtual camera may be displayed. The object 40 indicating the virtual camera may indicate, for example, the shooting position, shooting angle, shooting range, or viewpoint when viewers are viewing the video. When this object 40 is displayed, the distributor can distribute content while being aware of how viewers are viewing it.

A small marker (black circle) is added to the upper left of the object 30 indicating the table. In this way, the distributor knows that the object 30 indicating the table is being displayed on the distribution screen viewed by the viewers.

A small marker (black circle) is also added to the object 40 indicating the virtual camera. However, because the object 40 indicating the virtual camera is arranged in the private area, it is not displayed on the distribution screen viewed by viewers. Because a small marker (black circle) has not been added to the object 10 indicating the script and the object 20 indicating the timekeeper, they are not displayed on the distribution screen viewed by viewers.

The distributor can switch the settings indicating whether or not the object 10 indicating the script, the object 20 indicating the timekeeper, and the object 40 indicating the virtual camera are publicly disclosed. Publicly disclosed objects can also be moved into the area A2 serving as the private area.

FIG. 7 is a diagram showing an example of a distribution screen displayed on the viewer terminal 300. In area A3, an image rendered from the viewpoint of the object 40 indicating the virtual camera is displayed as a moving image in the video of the virtual space. A field for comments posted by viewers is displayed in area A4, and a post button B1 is displayed to the right of the comment field.

The virtual character 50 indicating the distributor and the object 30 indicating the table, which are subject to a public disclosure restriction setting, appear on the distribution screen. The area A2 set as a private area does not appear on the distribution screen. The virtual character 50 indicating the distributor, which does not appear in the video from the distributor's perspective in FIG. 6, appears in the distribution screen. This is because the viewpoints from the distributor terminal 200 and the viewer terminal 300 are different.

FIG. 8 is a diagram showing an example of video in virtual space displayed on the participant terminal 400a used by a viewer. In this example, the participant terminal 400a is subject to a disclosure restriction set by the distributor.

In this case, the participant terminal 400a does not display area A2 set as a private area in FIG. 6. Object 40 indicating the virtual camera located in area A2 set as a private area is also not displayed. Object 10 indicating a script and object 20 indicating a timekeeper are also not displayed because a disclosure restriction has been set. Because the video shown in FIG. 8 is rendered from the participant's own viewpoint, the viewpoint is different from those in FIG. 6 and FIG. 7.

FIG. 9 is a diagram showing an example of video in virtual space displayed on the participant terminal 400b used by another distributor. In this example, the distributor has applied a permission setting to the participant terminal 400b so the disclosure restriction settings are released.

In this case, the participant terminal 400b displays area A7 corresponding to area A2 set as a private area in FIG. 6. "Area A7 corresponding to area A2" means area A2 viewed from the viewpoint of the distributor and area A7 viewed from the viewpoint of the participant differ in terms of perspective. Area A7 also displays an object 40 indicating a virtual camera located in area A2 set as a private area.

Object 10 showing the script and object 20 showing the timekeeper are not shown in FIG. 9. However, they may also be displayed on the participant terminal 400b. The distributor can use the distributor terminal 200 to set a disclosure restriction setting for each object.

<Processing Flow>

An example of control processing executed by the content distribution server 100 will now be described with reference to FIG. 10. This processing is executed when a distributor terminal 200 logs in to the content distribution server 100 and starts preparing for the distribution of live content.

First, the control unit 140 displays pre-distribution video on the distributor terminal 200 (step S101).

The control unit 140 transmits the pre-distribution video and, for example, initial settings information to the distributor terminal 200 via the communication unit 110. When the participant participates with the distributor from the start, the control unit 140 also displays the pre-distribution video on the participant terminal 400.

The pre-distribution video can be, for example, video in virtual space including a background and various types of objects, and is video in virtual space set by the distributor for distribution. In the pre-distribution video, the virtual character may not be displayed or may be displayed in a state that is not linked to information on the distributor. In the pre-distribution video, virtual characters and objects stored in the storage unit 120 may be displayed so that the distributor can select the ones to be used in the distributed content.

Next, the information acquiring unit 141 in the control unit 140 acquires various types of information from the distributor terminal 200 via the communication unit 110 (step S102). The various types of information can be, for example, virtual character information and motion information used by the distributor. The information acquiring unit 141 in the control unit 140 also acquires various types of information from the participant terminal 400 via the communication unit 110 when the participant is participating in the distributed content.

The distribution unit 143 in the control unit 140 displays synthesized video on the distributor terminal 200 (step S103). Specifically, the video generating unit 142 in the control unit 140 generates video in virtual space in which the distributor information is synthesized as virtual character information. The distribution unit 143 in the control unit 140 transmits information indicating synthesized video in virtual space to the distributor terminal 200 via the communication unit 110.

When the participant participates in the distributed content, the video generating unit 142 in the control unit 140 generates video in virtual space that reflects information on the participant as information on the participant's virtual character. In this case, the distribution unit 143 in the control unit 140 also transmits information indicating synthesized video in virtual space synthesized to the participant terminal 400. However, this information differs from the information transmitted to the distributor terminal 200 because it shows video from the viewpoint of the participant.

Here, the control unit 140 receives various types of settings from the distributor terminal 200 via the communication unit 110 (step S104). The various types of settings include a first setting (disclosure restriction setting) received by the first setting receiving unit 144 and a second setting (permission setting) received by the second setting receiving unit 145.

The control unit 140 determines whether or not there is a disclosure restriction setting (step S105). When the control unit 140 determines that there is no disclosure restriction setting (step S105; N), the control unit 140 distributes live content based on the synthesized video in virtual space (step S109). In this case, the distribution unit 143 in the control unit 140 distributes live content to the distributor terminal 200, the viewer terminal 300, and the participant terminal 400 based on video in the same virtual space.

When the control unit 140 determines that there is a disclosure restriction setting (step S105; Y), it restricts the display of live content (step S106). The specific method used to restrict disclosure is described in the specific example above.

The control unit 140 also determines whether or not there is a permission setting (step S107). When the control unit 140 determines that there is no permission setting (step S107; N), the control unit 140 distributes live content based on the synthesized video in virtual space (step S109). In this case, the distribution unit 143 in the control unit 140 distributes live content with restrictions applied to the viewer terminal 300 and the participant terminal 400.

When the control unit 140 determines that there is a permission setting (step S107; Y), the control unit 140 releases display restrictions on the live content for the participant terminal 400 (step S108). In this case, the distribution unit 143 in the control unit 140 distributes live content based on the synthesized video in virtual space (step S109).

However, the live content with display restrictions applied is distributed to viewer terminals 300 and participant terminals 400 without permission settings. For example, live content with the objects subject to disclosure restrictions displayed is delivered to a participant terminal 400 with permission settings (for example, participant terminal 400*b*), and live content with the objects subject to disclosure restrictions not displayed is delivered to a participant terminal 400 without permission settings (for example, participant terminal 400*a*).

<Explanation of Effects>

In the content distribution system 1 according to the present embodiment, the content distribution server 100 includes a first setting receiving unit 144 that receives disclosure restriction settings, and the distributor terminal 200 includes a first setting information transmitting unit 285.

In this case, the distributor can set disclosure restrictions for objects displayed in virtual space. This makes it possible for a distributor to conveniently use an object that the distributor does not want seen by viewers on the distributor terminal 200 while not displaying the object on viewer terminals 300.

In the content distribution system 1 of the present embodiment, the content distribution server 100 also includes a second setting receiving unit 145 that receives permission settings, and the distributor terminal 200 includes a second setting information transmitting unit 286. In this case, the distributor can allow a participant to view an object with a disclosure restriction setting by applying a permission setting to the participant terminal 400. In this way, the distributor can restrict the disclosure based on distribution status.

The description of the embodiment has ended, but this embodiment is merely an example. Therefore, the specific configuration of the content distribution system 1 and the processing details etc. are not limited to those described in the embodiment. Modified examples of the embodiment will now be described. The configurational elements in the following explanation identical to those in the information content distribution system 1 are denoted using the same reference numbers.

Modified Examples

The order in which control processing is executed by the content distribution server 100 is not limited to the example shown in FIG. 10. For example, the processing for displaying pre-distribution video in step S101 may be omitted. The process of receiving various types of settings in step S104 may be executed during the distribution of live content after step S109, or may be executed before step S102 or step S103.

In the embodiment, the content distributed by the content distribution server 100 is modified according to various types of settings. In other words, the content display restrictions are executed at the distribution stage. However, the distributed content may be the same for everyone, with the display restrictions applied to the distributed content when the video is displayed on the receiving end. When the viewer terminal 300 or the participant terminal 400 executes the program and displays the content, the display restrictions may be applied based on the various settings. For example, modifications can be realized by the viewer terminal 300 or the participant terminal 400 which receive information on various settings from the distributor and perform operations based on this information.

The method used to set disclosure restrictions is not limited to the one used in the embodiment. For example, the first setting receiving unit 144 may receive a setting for displaying a pixelated object in the virtual space displayed on the distributor terminal 200. The distribution unit 143 may be configured so that the area overlapping the pixelated object is displayed on a viewer terminal 300 in a pixelated state, and the disclosure restriction setting for the object is set in the form of a pixelated object.

For example, in FIG. 11, a disk-shaped pixelated object 60 is displayed on the viewer terminal 300. The pixelated object 60 displays the overlapping area in a pixelated state. While a pixelated object 60 is displayed in a pixelated state on the viewer terminal 300, it is displayed in a transparent state on the distributor terminal 200 and on a participant terminal 400 with a permission setting.

In this case, the distributor can move the pixelated object 60 or the object to be concealed so that the object to be concealed overlaps with the pixelated object 60. The pixelated object 60 may be configured to be affixed to and to move with the virtual character of the distributor, or may be configured to move when the distributor performs a predetermined operation.

In this way, an object to be pixelated (such as an object 20 indicating a timekeeper) can be pixelated and displayed on the viewer terminal 300. However, the distributor and a participant with a permission setting are able to view the video with the pixelated object 60 rendered transparent in the area overlapping the pixelated object 60.

The pixelated object 60 does not have to be a disk as shown in FIG. 11. It may be any shape that covers the peripheral area like a container. In this case, the pixelated state can be maintained so that the object to be concealed is held even when the shooting angle of the virtual camera changes.

In the embodiment, a configuration for restricting the disclosure of objects displayed in virtual space at the convenience of the distributor was described in terms of disclosure restriction settings and permission settings. However, in addition to restricting the disclosure of objects, the content distribution server 100 may also be configured to restrict the disclosure of audio by controlling the distributor terminal 200, the viewer terminal 300, and the participant terminal 400.

For example, the content distribution server 100 may be configured to output different audio from the distributor terminal 200, the viewer terminal 300, and the participant terminal 400 based on disclosure restriction settings and permission settings. For example, the distributor terminal 200 and a participant terminal 400 with a permission setting may be configured to output a predetermined audio at a predetermined time, and the viewer terminals 300 may be configured to not output the predetermined audio. The predetermined audio may be provided as guidance based on the distribution schedule, such as "five minutes left" or may present subject matter on a topic to use by the distributor or the participant.

Control of audio output is not limited to this example. For example, in order to allow for confidential conversations between distributors and participants based on disclosure restrictions and permissions settings, the content distribution server 100 may be configured so that the distributor terminal 200 and the participant terminal 400 output a voice conversation, but viewer terminals 300 do not output voice conversation. This audio output control can be realized, for example, by getting the first setting receiving unit 144, the second setting receiving unit 145, and the audio output control units 283, 363, and 483 to work together.

In the content distribution system 1 of the embodiment, the distributor terminal 200, the viewer terminal 300, and the participant terminal 400 have different configurations so that they can be distinguished from each other. However, the components in each of these devices may be combined to form a device that functions as a distributor terminal, a viewer terminal, and a participant terminal.

In the content distribution system 1 according to the embodiment, the video generating unit 142 in the content distribution server 100 generates video in virtual space in which movement by the distributor is synthesized as movement by a virtual character. However, the content distribution server 100 may be configured without a video generating unit 142.

For example, the distributor terminal 200 may generate the video and transmit the video data to the content distribution server 100, and the content distribution server 100 may distribute live content based on the video data acquired from the distributor terminal 200. Also, processing substantially similar to the processing performed by the video generating unit 142 may be performed by the content distribution server 100 working with the distributor terminal 200. In this configuration, the processing burden on the content distribution server 100 can be reduced as compared to when the content distribution server 100 generates video in virtual space.

When the distributor terminal 200 is configured to generate the video, a participant terminal 400 participating in the distributed content acquires motion information and character information from the participant, generates video that reflects the movements of the participant as movements by a virtual character, and sends the video to the content distribution server 100. The content distribution server 100 then transmits the video data to the distributor terminal 200 used by the main distributor of the distributed content in which the participant is participating. The distributor terminal 200 used by the main distributor acquires the motion information and character information from the main distributor, generates video in virtual space, and synthesizes the video with video data from participants acquired from the content distribution server 100.

In this way, video data can be generated that shows the main distributor together with the participants. The distributor terminal 200 of the main distributor transmits the synthesized video data to the content distribution server 100, and the content distribution server distributes live content based on the video data.

In addition, the participant terminal 400 may transmit character information, motion information, and additional information etc. from the participant to the content distribution server 100 without video being generated by the participant terminal 400, the content distribution server 100 may transmit this information to the distributor terminal 200 used by the main distributor, and the distributor terminal 200 may generate video reflecting both motion information from the participant and motion information from the main distributor in a single virtual space. In this way, video data showing the participant and the main distributor together can be generated, and the content distribution server 100 can distribute live content based on this video data.

When the distributor terminal 200 generates video, the distributor terminal 200 can transmit disclosure restriction settings and permission settings while transmitting the generated video data. In this way, the content distribution server 100 can apply restrictions on the display of the distribution screen based on this information.

As a result, the content distribution server 100 does not have to include a video generating unit 142 to generate video in virtual space, but may simply acquire video in virtual space synthesizing movement by the distributor (or by a participant) as movement by a virtual character, and distribute live content based on the video.

The content distribution server 100 also does not have to distribute video data as live content. For example, the distribution unit 143 in the content distribution server 100 may distribute live content for synthesizing video in virtual space in which information from the distributor is used as information for a virtual character. In this case, the information required for the synthesis processing is distributed, and the viewer terminal 300 or participant terminal 400, etc. receiving the information synthesizes (renders) video based on disclosure restriction settings and permission settings, and displays the video.

When the content distribution server 100 distributes video data as live content, different live content may be distributed based on disclosure restriction settings depending on the destination of the distributed content. In this case, the viewer terminal 300 or the participant terminal 400 etc. receiving the data, simply displays video based on the received data. In other words, the content distribution server 100 restricts the display of a virtual character etc. based on the disclosure restriction setting received during distribution. However, when the content distribution server 100 distributes live content for synthesizing video, the viewer terminal 300 or the participant terminal 400 etc. receiving the live content performs the synthesizing process based on the received data. In this case, the content distribution server 100 distributes the same live content, and processing is executed in the receiving terminal based on the disclosure restriction settings.

The functions of the content distribution system in the present disclosure may also be realized by, for example, a computer executing a program instead of devices described above. The program for realizing the functions of the content distribution system 1 may be stored on a computer-readable medium such as USB (universal serial bus) memory, a CD-ROM (compact disc-read only memory), a DVD (digital versatile disc), or an HDD (hard disc drive), or may be downloaded to a computer via a network.

A preferred embodiment of the present disclosure was described above, but the present disclosure is not limited to this embodiment, and the present disclosure encompasses the invention described in the claims and that which is equivalent. Also, the configurations of the devices described in the embodiment and modified example can be combined when appropriate as long as there are no technical contradictions.

KEY TO THE DRAWINGS

1: Content distribution system
100: Content distribution server
200: Distributor terminal
300: Viewer terminal
400: Participant terminal
141: Information acquiring unit
142: Video generating unit
143: Distribution unit
144: First setting receiving unit
145: Second setting receiving unit
281, 361, 481: Content acquiring unit
282, 362, 482: Display control unit
283, 363, 483: Audio output control unit
284, 484: Inputted information transmitting unit
285: First setting information transmitting unit
286: Second setting information transmitting unit

The invention claimed is:

1. A content distribution server configured to:
distribute live content for synthesizing video in virtual space with information on a distributor as information on a virtual character;
receive a disclosure restriction setting from a distributor terminal configured to be used by the distributor for restricting a virtual object present in the virtual space displayed on a distributor terminal from being displayed on a viewer terminal configured to be used by a viewer for viewing the live content; and
receive a setting for setting aside an area in the virtual space displayed on the distributor terminal as a private area that is not displayed on a viewer terminal, and establish a public restriction setting for the virtual object via the private area,
wherein the content distribution server is configured to receive the virtual object in the virtual space from the distributor terminal and transmit the virtual object to the viewer terminal, and
wherein the content distribution server is further configured to output different audio from the distributor terminal and the viewer terminal based on the disclosure restriction setting,
wherein the virtual object subject to the disclosure restriction setting is a hidden object indicating a script, a timekeeper, a camera, or a position of a camera.

2. The content distribution server according to claim 1, further configured to receive a permission setting from the distributor terminal for displaying the virtual object subject to the disclosure restriction setting on a participant terminal used by a participant participating in distribution content from the distributor, wherein the virtual object subject to the disclosure restriction setting is displayed on a participant terminal receiving a permission setting from the distributor terminal, and the virtual object subject to the disclosure restriction setting is not displayed on a participant terminal not receiving a permission setting from the distributor terminal.

3. The content distribution server according to claim 1, further configured to receive a switching setting for the virtual object indicating whether or not to display the virtual object on the viewer terminal, and receive the switching setting as the disclosure restriction setting.

4. The content distribution server according to claim 1, further configured to receive a display changing setting for the virtual object to display the virtual object as another virtual object or to display the virtual object in a blurred state on the viewer terminal, and receive the display changing setting as the disclosure restriction setting.

5. The content distribution server according to claim 1, further configured to receive a setting for displaying a pixelated virtual object in the virtual space displayed on the distributor terminal, display the area overlapping with the pixelated virtual object in a pixelated state on a viewer terminal, and establish a public restriction setting for the virtual object via the pixelated virtual object.

6. The content distribution server according to claim 1, wherein the virtual object present in virtual space displayed on the distributor terminal is assigned a marker indicating whether or not the virtual object is subject to a disclosure restriction setting.

7. A content distribution method comprising:
distributing live content for synthesizing video in virtual space with information on a distributor as information on a virtual character and a virtual object existing in the virtual space displayed on a viewer terminal received from a distributor terminal configured to be used by the distributor;
receiving a disclosure restriction setting from the distributor terminal;
receiving a setting for setting aside an area in the virtual space displayed on the distributor terminal as a private area that is not displayed on a viewer terminal, and establishing a public restriction setting for the virtual object via the private area; and
outputting different audio from the distributor terminal and the viewer terminal based on the disclosure restriction setting,
wherein the content distribution server is configured to receive the virtual object in the virtual space from the distributor terminal and transmit the virtual object to the viewer terminal,
wherein the distributor terminal configured to be used by the distributor for restricting a virtual object present in the virtual space displayed on a distributor terminal from being displayed on a viewer terminal configured to be used by a viewer for viewing the live content, and
wherein the virtual object subject to the disclosure restriction setting is a hidden object indicating a script, a timekeeper, a camera, or a position of a camera.

8. A program contained on a non-volatile memory coupled to a processor configured to cause a computer to:
distribute live content for synthesizing video in virtual space with information on a distributor as information on a virtual character and a virtual object present in the virtual space displayed on a viewer terminal from a distributor terminal configured to be used by the distributor;
receive a disclosure restriction setting from the distributor terminal;
receive a setting for setting aside an area in the virtual space displayed on the distributor terminal as a private area that is not displayed on a viewer terminal, and establish a public restriction setting for the virtual object via the private area; and
output different audio from the distributor terminal and the viewer terminal based on the disclosure restriction setting,
wherein the content distribution server is configured to receive the virtual object in the virtual space from the distributor terminal and transmit the virtual object to the viewer terminal,
wherein the distributor terminal configured to be used by the distributor for restricting a virtual object present in the virtual space displayed on a distributor terminal from being displayed on a viewer terminal configured to be used by a viewer for viewing the live content, and
wherein the virtual object subject to the disclosure restriction setting is a hidden object indicating a script, a timekeeper, a camera, or a position of a camera.

* * * * *